US012753803B2

(12) United States Patent
Allison

(10) Patent No.: US 12,753,803 B2
(45) Date of Patent: Oct. 6, 2026

(54) CLAMP DEVICE

(71) Applicant: David Allison, Clifton, TX (US)

(72) Inventor: David Allison, Clifton, TX (US)

( * ) Notice: Subject to any disclaimer, the term of this patent is extended or adjusted under 35 U.S.C. 154(b) by 481 days.

(21) Appl. No.: 18/456,550

(22) Filed: Aug. 28, 2023

(65) Prior Publication Data

US 2024/0200612 A1 Jun. 20, 2024

Related U.S. Application Data

(60) Provisional application No. 63/432,811, filed on Dec. 15, 2022.

(51) Int. Cl.
*F16D 3/84* (2006.01)

(52) U.S. Cl.
CPC .................................... *F16D 3/845* (2013.01)

(58) Field of Classification Search
CPC ........ F16D 3/845; F16D 3/227; F16D 3/2055; F16J 3/042; F16J 3/046; F16B 7/105
See application file for complete search history.

(56) References Cited

U.S. PATENT DOCUMENTS

| | | | | | |
|---|---|---|---|---|---|
| 3,447,727 | A | | 6/1969 | Lowe | |
| 3,962,889 | A | | 6/1976 | Stillwagon | |
| 4,224,808 | A | * | 9/1980 | Gehrke | F16D 3/845 277/504 |
| 4,558,869 | A | | 12/1985 | Grove | |
| 4,786,272 | A | * | 11/1988 | Baker | F16D 3/845 464/175 |
| 4,936,811 | A | * | 6/1990 | Baker | F16D 3/2055 277/637 |
| 5,078,652 | A | * | 1/1992 | Baker | F16J 3/042 464/175 |
| 6,089,574 | A | * | 7/2000 | Sadr | F16D 3/845 277/635 |
| 6,099,788 | A | * | 8/2000 | Sadr | B29C 66/8242 264/516 |
| 6,139,027 | A | | 10/2000 | Biekx | |
| 6,220,969 | B1 | | 4/2001 | Lilley | |
| 6,471,595 | B1 | * | 10/2002 | Neviani | F16D 3/845 464/175 |
| 8,028,999 | B2 | * | 10/2011 | Wolf | F16D 3/845 277/634 |
| 12,392,381 | B2 | * | 8/2025 | Ruiz | F16D 3/2055 |
| 2007/0142116 | A1 | * | 6/2007 | Nakamura | F16J 3/045 464/175 |
| 2010/0084826 | A1 | | 4/2010 | Wolf | |

* cited by examiner

*Primary Examiner* — Daniel J Wiley
(74) *Attorney, Agent, or Firm* — Brennan, Manna & Diamond, LLC

(57) ABSTRACT

A novel clamp device is described herein. The device is a modified clamping style for the CV boot of a Porsche and other vehicles. The device is comprised of an aluminum and tubular clamp for the CV that allows for maximum accessibility of the angle. Specifically, the aluminum clamp is segmented into three equal parts with different diameters to accommodate different drive shafts. Silicone or grease can be used to hold the parts in position for assembly. On one end is a groove for the clamp to sit, while the other side features an inside bore located where the clamp area of the boot sits. When the band is in position, it locks the aluminum pieces in position to allow full travel of the boot with no abrasion damage.

16 Claims, 3 Drawing Sheets

CLAMP DEVICE

CROSS-REFERENCE TO RELATED APPLICATION

The present application claims priority to, and the benefit of, U.S. Provisional Application No. 63/432,811, which was filed on Dec. 15, 2022, and is incorporated herein by reference in its entirety.

FIELD OF THE INVENTION

The present invention relates generally to the field of clamp devices. More specifically, the present invention relates to an improved clamp for CV boots on a vehicle. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in clamp devices. Generally, with a fast boot style CV boot, users will lose degrees of articulation in off-roading conditions. The clamp location on the boot will plunge, and the shaft side of the factory clamp will contact the boot and create a hole. Grease can leak from the boot and cause damage to the internal machinery.

A universal joint, such as a constant velocity (CV) joint in a drive assembly of a front wheel drive vehicle, can require a boot to seal the joint from environmental contaminants found on a highway or other vehicle driving surface. Typically, such boots are attached using a clamp, however, as stated supra, the clamp location can move and contact the boot, creating a hole.

Accordingly, a need remains for a clamp device that secures the boot and prevents no abrasion damage. Further, a clamp device is necessary to provide maximum accessibility of the angle to allow the CV clamp to run efficiently.

Therefore, there exists a long-felt need in the art for a clamp device that provides users with an improved clamp for CV boots on a vehicle. There is also a long-felt need in the art for a clamp device that features a tubular aluminum clamp with a steel band that secures the device to the CV boot. Further, there is a long-felt need in the art for a clamp device that allows for maximum accessibility of the angle to allow the CV to run efficiently. Moreover, there is a long-felt need in the art for a device that utilizes a lightweight and durable construction to prevent any interference within the vehicle machinery. Further, there is a long-felt need in the art for a clamp device that is segmented into three equal parts with different diameters to accommodate different drive shafts. Finally, there is a long-felt need in the art for a clamp device that utilizes silicone or grease to hold the parts in position for assembly.

The subject matter disclosed and claimed herein, in one embodiment thereof, comprises a clamp device. The device is a modified clamping style for the CV boot of a Porsche and other vehicles. The device is comprised of an aluminum and tubular clamp for the CV that allows for maximum accessibility of the angle to allow the CV to run at. The device is extremely lightweight and durable. Specifically, the aluminum clamp is segmented into three equal parts with different diameters to accommodate different drive shafts. Silicone or grease can be used to hold the parts in position for assembly. On one end is a groove for the clamp to sit while the other side features an inside bore located where the clamp area of the boot sits. When the band is in position, it locks the aluminum pieces in position to allow full travel of the boot with no abrasion damage.

In this manner, the clamp device of the present invention accomplishes all of the foregoing objectives and provides users with a device that provides for a clamp and a band applied to a CV boot. The device is a segmented clamp that is placed on a CV boot. The device can be manufactured of an aluminum or other material.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a clamp device. The device is a modified clamping style for the CV boot of a Porsche and other vehicles. The device is comprised of an aluminum and tubular clamp for the CV that allows for maximum accessibility of the angle to allow the CV to run efficiently. Specifically, the aluminum clamp is segmented into three equal parts with different diameters to accommodate different drive shafts. Silicone or grease can be used to hold the parts in position for assembly. A band locks the clamp in position, which allows full travel of the boot with no abrasion damage.

In one embodiment, an injection-molded, convoluted boot is illustrated and mounted on the body of a typical constant velocity (CV) joint. Typically, any suitable CV boot can be utilized as is known in the art. Further, the clamp device can be any suitable shape and size as is known in the art, to be utilized with any suitable shape and size of CV boot, depending on the needs and/or wants of a user. Additionally, the CV boot is preferably formed of a polyester elastomer, although other materials as is known in the art may be used.

The CV boot is formed with a plurality of annular, axially connected, individual convolutions which extend along the length of the CV boot between the small end and the large end. The convolutions conventionally provide for flexing of the CV boot while protecting the CV joint from intrusion of dirt and the like. The CV joint is customarily provided with an outwardly opening annular groove, forming a clamping region for the CV boot.

In one embodiment, the clamp device comprises an aluminum clamp that is segmented into three equal parts with different diameters to accommodate different drive shafts. Specifically, when the aluminum clamp component is secured together in a tubular formation, it forms a specific diameter to accommodate a specific drive shaft. Generally, the aluminum clamp component can be any suitable shape and size as is known in the art. Further, the aluminum clamp component can be configured in various sizes to form various diameters to engage the various drive shafts, as is known in the art.

In one embodiment, the clamp device comprises silicone and/or grease which is utilized to hold the aluminum clamp segments together. Further, any other suitable substances can be utilized, as is known in the art, to hold the clamp segments together.

In one embodiment, the clamp segments, once secured together, comprise a first end with a groove for the band component to sit. Further, the second end comprises an inside bore, located where the clamp area of the CV boots sits.

In one embodiment, a band component is secured around the assembled clamp segments. Specifically, the band component is secured around a groove area, near the top of the assembled clamp segments. When the band component is in position, the band component locks the clamp segments in place to allow full travel of the CV boot with no abrasion damage. Further, once in position, the band component is locked in place via a locking clamp or other suitable locking means as is known in the art. Generally, the band component is manufactured of steel, but can be any suitable device as is known in the art. Thus, the device allows for maximum accessibility of the angle to allow the CV to run efficiently and secures the clamp segments to the CV boot.

In one embodiment, the clamp device is manufactured of aluminum, stainless steel, etc., or any other suitable materials as is known in the art. Generally, the clamp device utilizes an extremely lightweight and durable construction to prevent any interferences within the vehicle machinery.

In this manner, the clamp device may be secured to the CV boot sufficiently, so as to form a seal between the CV boot and the device, providing a retention or gripping force to resist axial dislodgement which preserves the integrity of the seal between the boot and the joint, over a wide variety of operating conditions.

In yet another embodiment, the clamp device comprises a plurality of indicia.

In yet another embodiment, a method of securing a clamp to a CV boot is disclosed. The method includes the steps of providing a clamp device comprising a segmented body component, forming three equal parts which are held together by a band. The method also comprises securing the three equal parts together and holding them in position via silicone or grease. Further, the method comprises positioning the band over the segmented body component to secure it together. Finally, the method comprises applying the device to a CV boot to allow full travel of the boot with no abrasion damage.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
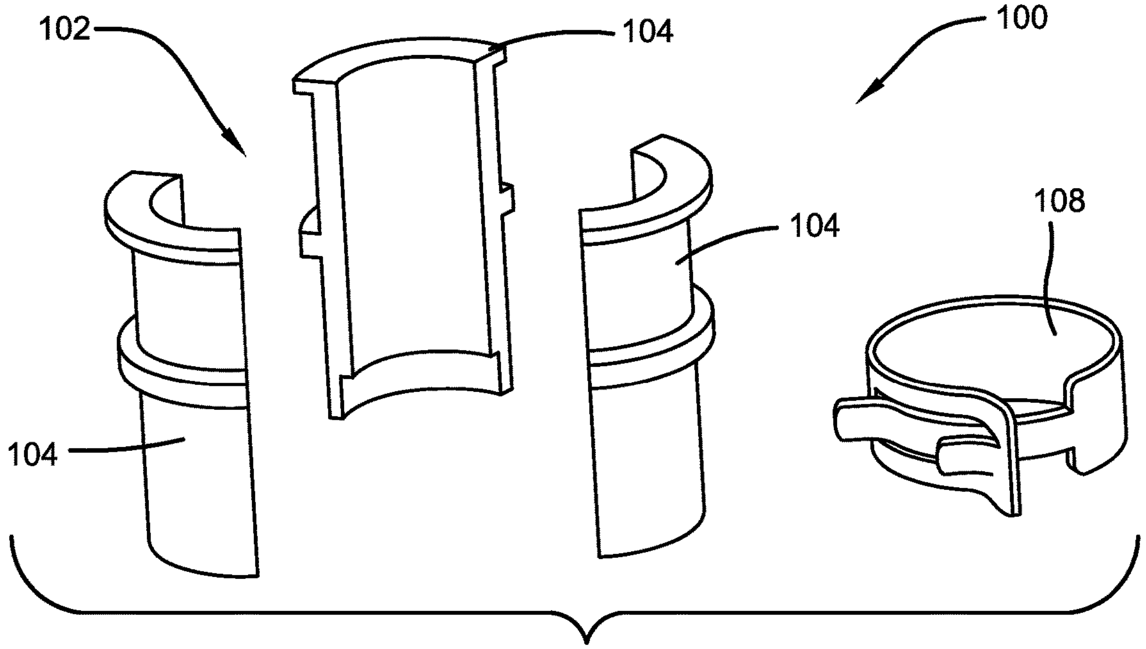
FIG. 1 illustrates a perspective view of one embodiment of the clamp device of the present invention showing the clamp and band components in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a clamp device that provides users with an improved clamp for CV boots on a vehicle. There is also a long-felt need in the art for a clamp device that features a tubular aluminum clamp with a steel band that secures the device to the CV boot. Further, there is a long-felt need in the art for a clamp device that allows for maximum accessibility of the angle to allow the CV to run efficiently. Moreover, there is a long-felt need in the art for a device that utilizes a lightweight and durable construction to prevent any interference within the vehicle machinery. Further, there is a long-felt need in the art for a clamp device that is segmented into three equal parts with different diameters to accommodate different drive shafts. Finally, there is a long-felt need in the art for a clamp device that utilizes silicone or grease to hold the parts in position for assembly.

The present invention, in one exemplary embodiment, is a novel clamp device. The device is a modified clamping style for the CV boot of a Porsche and other vehicles. The device is comprised of an aluminum and tubular clamp for the CV that allows for maximum accessibility of the angle to allow the CV to run at. Specifically, the aluminum clamp is segmented into three equal parts with different diameters to accommodate different drive shafts. Silicone or grease can be used to hold the parts in position for assembly. On one end is a groove for the clamp to sit while the other side features an inside bore located where the clamp area of the boot sits. When the band is in position, it locks the aluminum pieces in position to allow full travel of the boot with no abrasion damage. The present invention also includes a novel method of securing a clamp to a CV boot. The method includes the steps of providing a clamp device comprising a segmented body component, forming three equal parts, which are held together by a band. The method also comprises securing the three equal parts together and holding them in position via silicone or grease. Further, the method comprises positioning the band over the segmented body component to secure it together. Finally, the method comprises applying the device to a CV boot to allow full travel of the boot with no abrasion damage.

Referring initially to the drawings, FIG. 1 illustrates a perspective view of one embodiment of the clamp device 100 of the present invention. In the present embodiment, the clamp device 100 is an improved clamp device 100 that provides a user with a modified clamp for a CV boot 106 of a Porsche or other vehicle. Specifically, the clamp device 100 comprises a body component 102 with a segmented portion 104, such that the body component 102 is segmented into three equal parts 104 (or segments). Additionally, a band component 108 locks the clamp segments 104 in position, which allows full travel of the CV boot 106 with no abrasion damage. Further, the device 100 allows for maximum accessibility of the angle to allow the CV boot 106 to run efficiently.

Figure 3:
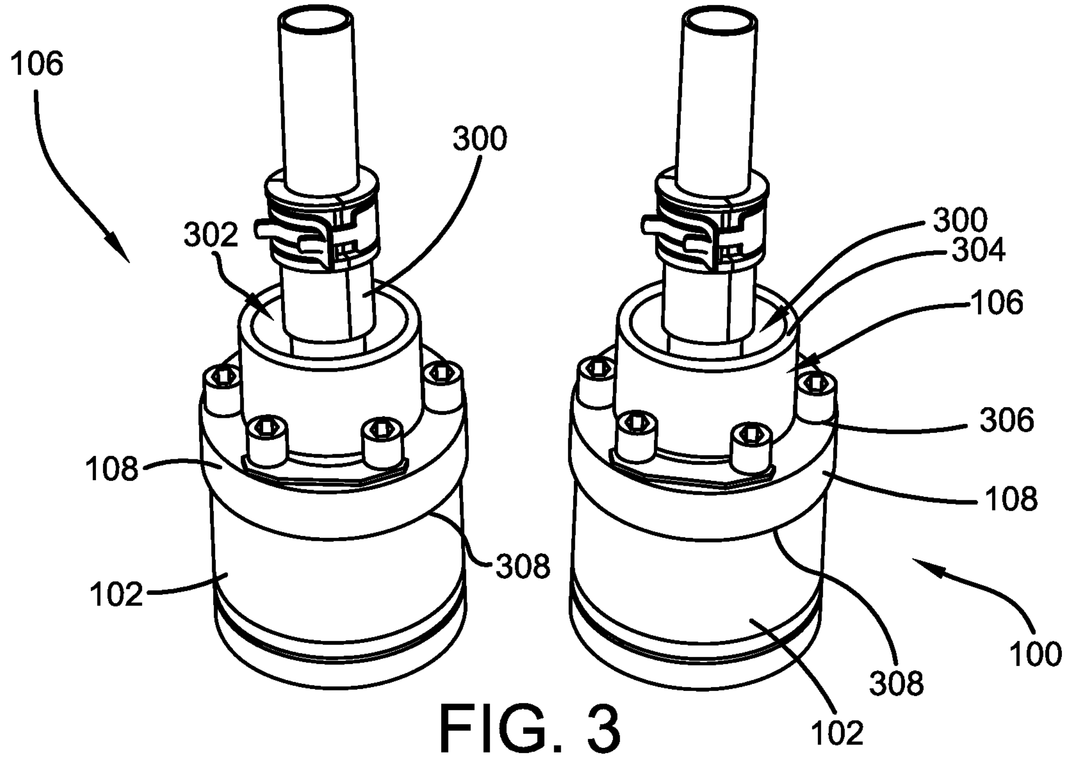
FIG. 3 illustrates a perspective view of one embodiment of the clamp device of the present invention showing how the clamp and band are applied to the CV boot in accordance with the disclosed architecture.
Figure 4:
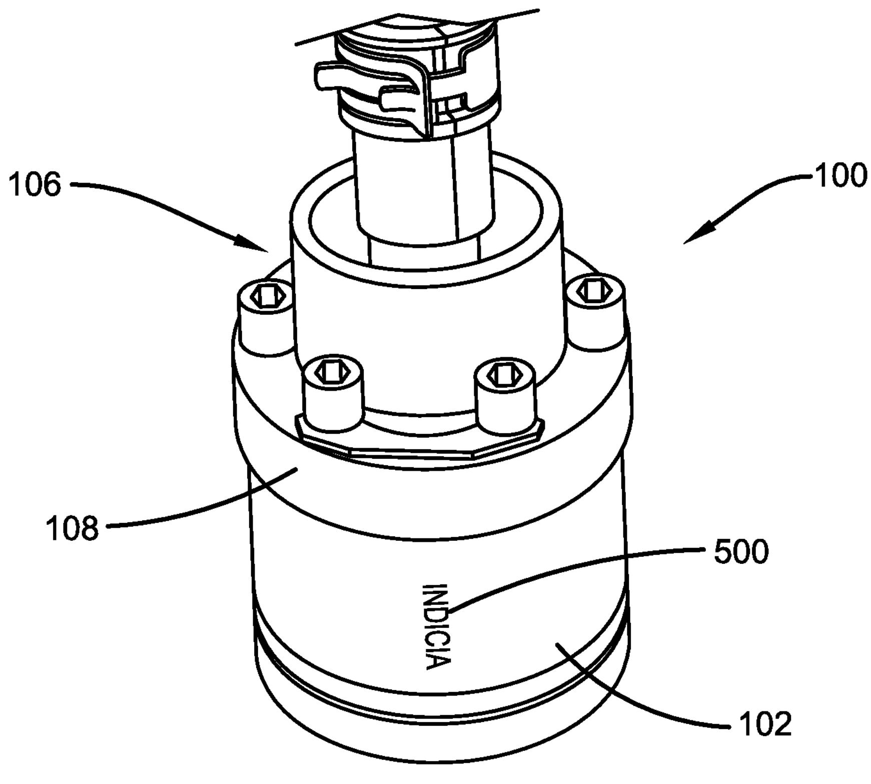
FIG. 4 illustrates a perspective view of one embodiment of the clamp device of the present invention showing how the device is applied to a CV boot in accordance with the disclosed architecture.
Figure 5:
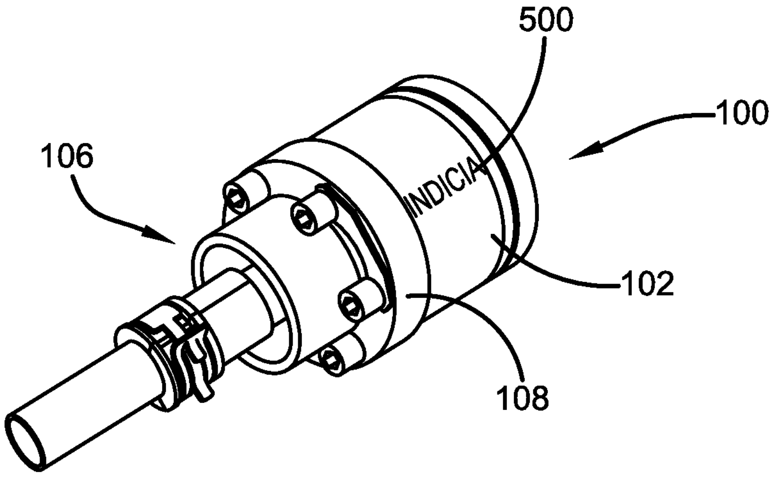
FIG. 5 illustrates a perspective view of one embodiment of the clamp device of the present invention showing the device in use in accordance with the disclosed architecture.

Generally, as shown in FIGS. 3-5, an injection-molded convoluted boot 106 is illustrated and mounted on the body of a typical constant velocity (CV) joint 300. Typically, any suitable CV boot 106 can be utilized as is known in the art. Further, the clamp device 100 can be any suitable shape and size as is known in the art, to be utilized with any suitable shape and size of CV boot 106, depending on the needs and/or wants of a user. Additionally, the CV boot 106 is preferably formed of a polyester elastomer, although other materials as is known in the art may be used. Typically, any suitable CV boot 106 can be utilized with the present device 100, depending on the needs and/or wants of a user.

Furthermore, the CV boot 106 is formed with a plurality of annular, axially connected, individual convolutions 302 which extend along the length of the CV boot 106 between the small end 304 and the large end 306. The convolutions 302 conventionally provide for flexing of the CV boot 106 while protecting the CV joint 300 from intrusion of dirt and the like. The CV joint 300 is customarily provided with an outwardly opening annular groove 308, forming a clamping region for the CV boot 106.

As shown in FIG. 1, the clamp device 100 comprises a body component 102, which is an aluminum clamp that is segmented into three equal parts 104 with different diameters to accommodate different drive shafts. Specifically, when the aluminum body component 102 is secured together in a tubular formation, it forms a specific diameter to accommodate a specific drive shaft. Generally, the aluminum body component 102 can be any suitable shape and size as is known in the art. Further, the aluminum body component 102 can be configured in various sizes to form various diameters to engage the various drive shafts, as is known in the art.

Figure 2:
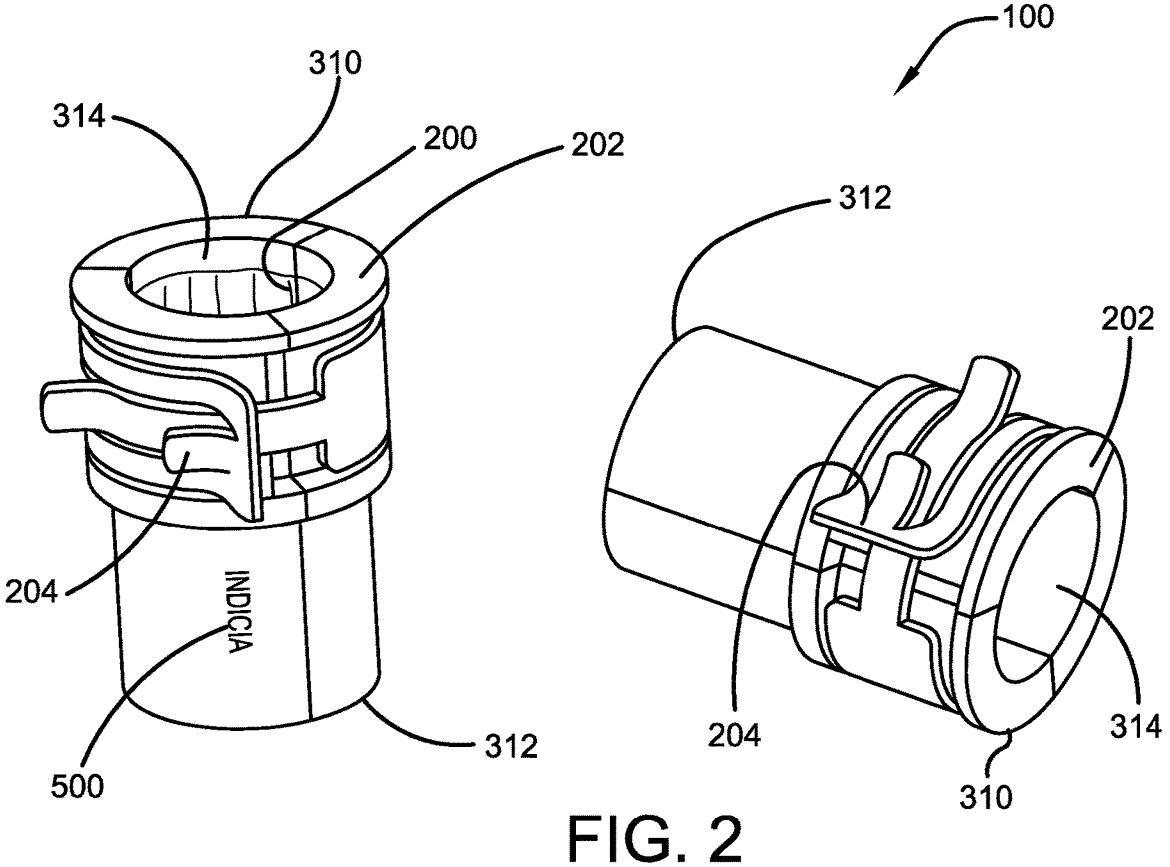
FIG. 2 illustrates a perspective view of one embodiment of the clamp device of the present invention showing how the band is applied to the tubular clamp in accordance with the disclosed architecture.

As shown in FIG. 2, the clamp device 100 comprises silicone and/or grease 200 which is utilized to hold the aluminum clamp segments 104 together. Further, any other suitable substances can be utilized, as is known in the art, to hold the clamp segments 104 together.

Further, a band component 108 is secured around the assembled clamp segments 104. Specifically, the band component 108 is secured around a groove area 308 near the top 202 of the assembled clamp segments 104. When the band component 108 is in position, the band component 108 locks the clamp segments 104 in place to allow full travel of the CV boot 106 with no abrasion damage. Further, once in position, the band component 108 is locked in place via a locking clamp 204, ratcheting lock, etc., or other suitable locking means as is known in the art. Generally, the band component 108 is manufactured of steel, but can be any suitable material as is known in the art. Thus, the device 100 allows for maximum accessibility of the angle to allow the CV joint 300 to run efficiently and secures the clamp segments 104 to the CV boot 106.

As shown in FIG. 3, the clamp segments 104, once secured together, comprise a first end 310 with a groove 308 for the band component 108 to sit. Further, the second end 312 comprises an inside bore 314 located where the clamp area of the CV boots 106 sits.

As shown in FIG. 4, the clamp device 100 is manufactured of aluminum, stainless steel, etc., or any other suitable materials as is known in the art. Generally, the clamp device 100 utilizes an extremely lightweight and durable construction to prevent any interferences within the vehicle machinery.

As shown in FIG. 5, in this manner, the clamp device 100 may be secured to the CV boot 106 sufficiently, so as to form a seal between the CV boot 106 and the device 100, providing a retention or gripping force to resist axial dislodgement, which preserves the integrity of the seal between the boot 106 and the joint 300 over a wide variety of operating conditions.

In yet another embodiment, the clamp device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included such as, but not limited to, patterns, logos, emblems, images, symbols, designs, letters, words, characters, animals, advertisements, brands, etc., that may or may not be CV boot, clamp, or brand related.

Figure 6:
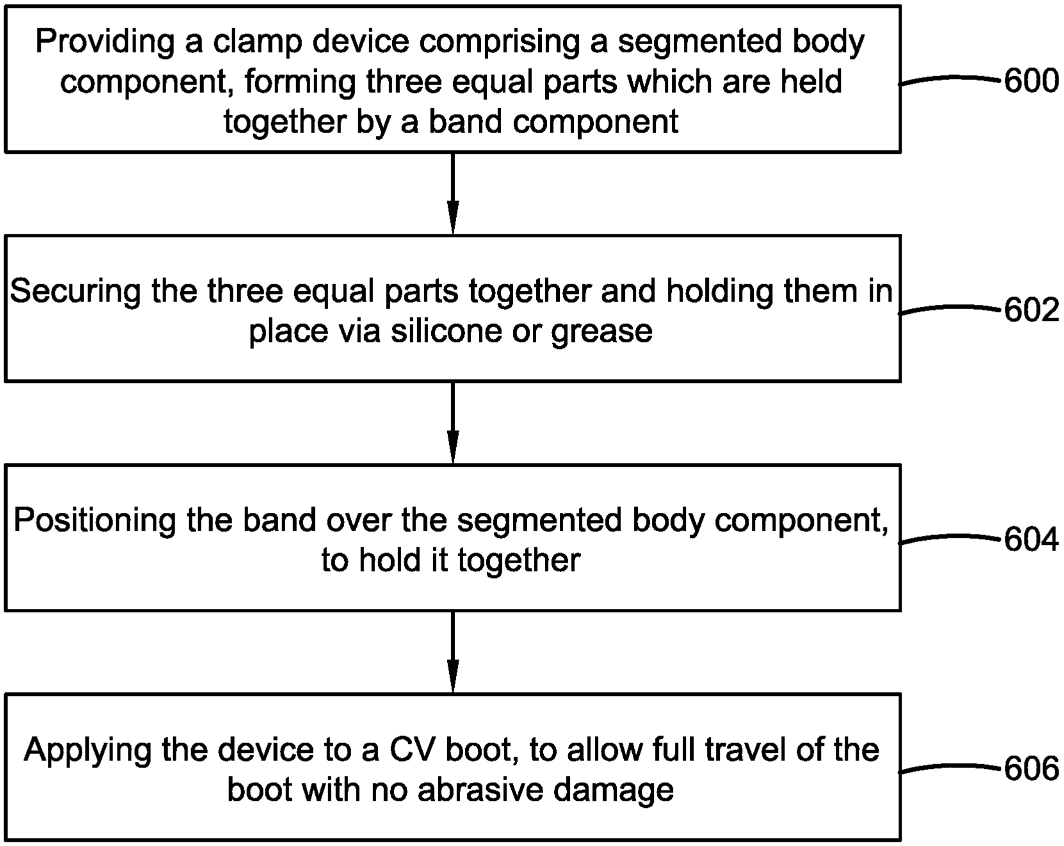
FIG. 6 illustrates a flowchart showing the method of securing a clamp to a CV boot in accordance with the disclosed architecture.

FIG. 6 illustrates a flowchart of the method of securing a clamp to a CV boot. The method includes the steps of at 600, providing a clamp device comprising a segmented body component, forming three equal parts, which are held together by a band. The method also comprises at 602, securing the three equal parts together and holding them in position via silicone or grease. Further, the method comprises at 604, positioning the band over the segmented body component to secure it together. Finally, the method comprises at 606, applying the device to a CV boot to allow full travel of the boot with no abrasion damage.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "clamp device" and "device" are interchangeable and refer to the clamp device 100 of the present invention.

Notwithstanding the foregoing, the clamp device 100 of the present invention can be of any suitable size and configuration as is known in the art without affecting the overall concept of the invention, provided that it accomplishes the above-stated objectives. One of ordinary skill in the art will appreciate that the clamp device 100 as shown in FIGS. 1-6 are for illustrative purposes only, and that many other sizes and shapes of the clamp device 100 are well within the scope of the present disclosure. Although the dimensions of the clamp device 100 are important design parameters for user convenience, the clamp device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A clamp device for a CV boot for a vehicle, the clamp device comprising:
- a body component; and
- a band component comprising a ratcheting lock;
- wherein the body component is segmented into three equal parts;
- wherein the band component locks the three equal parts together to form a tubular formation;
- wherein grease is utilized to hold the three equal parts together; and
- further wherein the band component is secured around the tubular formation and is locked in place via the ratcheting lock.

2. The clamp device of claim 1, wherein a convoluted boot is mounted on a body of a constant velocity (CV) joint to form the CV boot.

3. The clamp device of claim 2, wherein the CV boot is formed with a plurality of convolutions which extend along a length of the CV boot.

4. The clamp device of claim 3, wherein the CV boot comprises an annular groove.

5. The clamp device of claim 4, wherein the body component is segmented into three equal parts with different diameters to accommodate different drive shafts.

6. The clamp device of claim 1, wherein the band component is manufactured of steel.

7. The clamp device of claim 1, wherein the body component is manufactured of aluminum.

8. The clamp device of claim 7, wherein the three equal parts, once secured together, comprise a first end with the annular groove for the band component to sit.

9. The clamp device of claim 8, wherein the three equal parts, once secured together, comprise a second end which comprises an inside bore, where the CV boots sits.

10. A clamp device for a CV boot for a vehicle, the clamp device comprising:
- a body component; and
- a band component comprising a locking clamp;
- a character indicia stamped into the body component;
- wherein the body component is segmented into three equal parts with different diameters to accommodate different drive shafts;
- wherein grease is utilized to hold the three equal parts together;
- wherein the band component is secured around an annular groove to assemble the three equal parts;
- wherein the band component is locked in place around the three equal parts via the locking clamp;
- wherein the three equal parts, once secured together, comprise a first end with the annular groove for the band component to sit; and
- wherein the three equal parts, once secured together, comprise a second end which comprises an inside bore, where a CV boots sits.

11. The clamp device of claim 10, wherein the band component is manufactured of steel.

12. The clamp device of claim 10, wherein the body component is manufactured of aluminum.

13. The clamp device of claim 10, wherein a convoluted boot is mounted on a body of a typical constant velocity (CV) joint to form the CV boot.

14. The clamp device of claim 13, wherein the CV boot is formed with a plurality of convolutions which extend along a length of the CV boot.

15. The clamp device of claim 10, wherein the clamp device is secured to the CV boot, so as to form a seal between the CV boot and the clamp device, providing a gripping force to resist axial dislodgement, over a wide variety of operating conditions.

16. A method of securing a clamp according to claim 1 to a CV boot, the method comprising the following steps:
- providing a clamp device comprising a segmented body component, forming three equal parts, which are held together by a locking clamp of a band component;
- securing the three equal parts together and holding them in position via silicone or grease;
- positioning the band over the segmented body component, to secure it together; and
- applying the device to a CV boot.

* * * * *